United States Patent
Sohn et al.

(10) Patent No.: US 10,885,383 B2
(45) Date of Patent: Jan. 5, 2021

(54) UNSUPERVISED CROSS-DOMAIN DISTANCE METRIC ADAPTATION WITH FEATURE TRANSFER NETWORK

(71) Applicant: NEC Laboratories America, Inc., Princeton, NJ (US)

(72) Inventors: Kihyuk Sohn, Fremont, CA (US); Manmohan Chandraker, Santa Clara, CA (US); Xiang Yu, Mountain View, CA (US)

(73) Assignee: NEC Corporation

( * ) Notice: Subject to any disclaimer, the term of this patent is extended or adjusted under 35 U.S.C. 154(b) by 54 days.

(21) Appl. No.: 16/400,429

(22) Filed: May 1, 2019

(65) Prior Publication Data
US 2019/0354801 A1    Nov. 21, 2019

Related U.S. Application Data

(60) Provisional application No. 62/672,567, filed on May 16, 2018.

(51) Int. Cl.
*G06K 9/62* (2006.01)
*G06N 20/20* (2019.01)
*G06K 9/00* (2006.01)

(52) U.S. Cl.
CPC ....... *G06K 9/6234* (2013.01); *G06K 9/00221* (2013.01); *G06K 9/627* (2013.01); *G06K 9/628* (2013.01); *G06K 9/6219* (2013.01); *G06N 20/20* (2019.01)

(58) Field of Classification Search
CPC ............ G06K 9/6234; G06K 9/00221; G06K 9/6219; G06K 9/627; G06K 9/628; G06N 20/20
See application file for complete search history.

(56) References Cited

PUBLICATIONS

Xu et al, "Cross-Domain Visual Recognition via Domain Adaptive Dictionary Learning", Apr. 16, 2018, arXiv preprint arXiv: 1804. 04687, 14 pages (Year: 2018).*
Ganin, "Unsupervised Domain Adaptation by Backpropagation", ICML, Feb. 2015, 10 pages.
Sohn, "Unsupervised Domain Adaptation for Face Recognition in Unlabeled Videos", ICCV, Aug. 2017, 9 pages.

* cited by examiner

*Primary Examiner* — David F Dunphy
(74) *Attorney, Agent, or Firm* — Joseph Kolodka (57) ABSTRACT

A method for implementing an unsupervised cross-domain distance metric adaptation framework with a feature transfer network for enhancing facial recognition includes recursively training a feature transfer network and automatic labeling of target domain data using a clustering method, and implementing the feature transfer network and the automatic labeling to perform a facial recognition task.

18 Claims, 5 Drawing Sheets

UNSUPERVISED CROSS-DOMAIN DISTANCE METRIC ADAPTATION WITH FEATURE TRANSFER NETWORK

RELATED APPLICATION INFORMATION

This application claims priority to provisional application Ser. No. 62/672,567, filed on May 16, 2018, incorporated by reference herein its entirety.

BACKGROUND

Technical Field

The present invention relates to artificial intelligence and machine learning, and more particularly to facial recognition technology.

Description of the Related Art

Globalization of facial analysis engines is generally heavily dependent on supervised information at the training of the recognition engine. That is, in order to adapt a facial analysis engine to a new ethnicity domain, one may need to collect large-scale face data of a population associated with the ethnicity domain and annotate collected data with respect to the task of interest (e.g., facial identification, and gender prediction and age estimation).

SUMMARY

According to an aspect of the present invention, a method for implementing an unsupervised cross-domain distance metric adaptation framework with a feature transfer network for enhancing facial recognition is provided. The method includes recursively training a feature transfer network based on a source domain associated with labeled source data and a target domain associated with unlabeled target data, and automatic labeling of target domain data using a clustering method. Training the feature transfer network includes training a first domain discriminator and a second domain discriminator, including training an objective function corresponding to the first domain discriminator and an objective function corresponding to the second domain discriminator, and training a feature generator and a feature transformer based on the first and second domain discriminators, including training an objective function corresponding to the feature generator and an objective function corresponding to the feature transformer. The method further includes implementing the feature transfer network and the automatic labeling to perform a facial recognition task.

In accordance with another embodiment of the present invention, a system for implementing an unsupervised cross-domain distance metric adaptation framework with a feature transfer network for enhancing facial recognition is provided. The system includes a memory device for storing program code and at least one processor device operatively coupled to the memory device. The at least one processor device is configured to execute program code stored on the memory device to recursively train a feature transfer network based on a source domain associated with labeled source data and a target domain associated with unlabeled target data, and automatic labeling of target domain data using a clustering method. The at least one processor device is configured to train the feature transfer network by training a first domain discriminator and a second domain discriminator, including training an objective function corresponding to the first domain discriminator and an objective function corresponding to the second domain discriminator, and training a feature generator and a feature transformer based on the first and second domain discriminators, including training an objective function corresponding to the feature generator and an objective function corresponding to the feature transformer. The at least one processor device is further configured to implement the feature transfer network and the automatic labeling to perform a facial recognition task.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The embodiments described herein provide for systems and methods implementing a cross-domain distance metric adaptation framework with a feature transfer network for enhancing facial recognition. The embodiments described herein can be applied to situations where label spaces of source and target domains are disjoint. More specifically, the feature transfer network can generate an augmented source domain embedding space to allow joint domain adversarial and domain separation training in a unified framework. A series of training objectives can be introduced to train the feature transfer network, which can include feature reconstruction loss, classification loss, domain adversarial loss and domain separation loss.

The embodiments described herein can provide a domain adaptation framework for classification and distance metric learning when a source domain has abundant labeled training data and the target domain has abundant unlabeled training data. For example, the embodiments described herein provide for a domain adaptation framework with auxiliary classification modules for tasks such as, e.g., cross-ethnicity age estimation.

Figure 1:
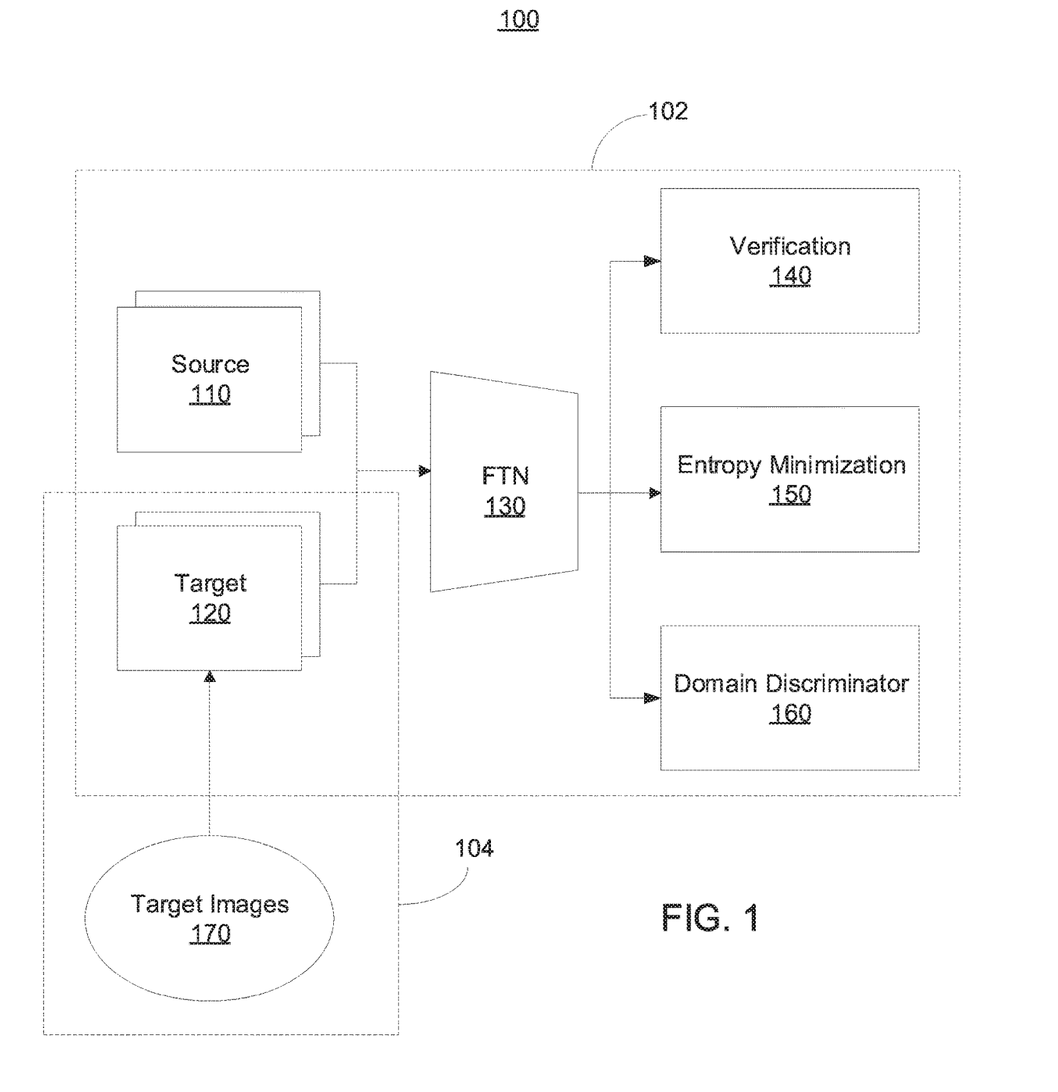
FIG. 1 is a block/flow diagram of an overview of system for implementing an unsupervised cross-domain distance metric adaptation framework with a feature transfer network for enhancing facial recognition, in accordance with an embodiment of the present invention.

Referring now in detail to the figures in which like numerals represent the same or similar elements and initially to FIG. 1, a block/flow diagram is provided illustrating a high-level overview of a system 100 for implementing an unsupervised cross-domain distance metric adaptation framework with a feature transfer network for enhancing facial recognition.

As shown, the system 100 can include a feature transfer network (FTN) subsystem 102 and an automatic labeling subsystem 104. A training framework can be achieved by recursively or iteratively training the FTN with respect to the FTN subsystem 102 and automatic labeling of data using the trained FTN with respect to the automatic labeling subsystem 104. The training of the FTN and the automatic labeling can be implemented within a neural network to perform facial recognition.

The FTN subsystem 102 can include a source domain 110 and a target domain 120. The source domain 110 can be a labeled domain including labeled examples, while the target domain 120 can be an unlabeled domain including unlabeled examples. In an illustrative embodiment, the source and target domains 110 and 120 can correspond to respective ethnicities. For example, the source domain 110 can correspond to a source ethnicity, and the target domain 120 can correspond to a target ethnicity.

The system 100 can be used to perform a verification task. More specifically, the verification task can include a binary classification task shared across the source and target domains 110 and 120 that takes a pair of images as an input and predicts a label of "1" if the pair of images shared the same identity, and predicts a label of "0" otherwise. The goal of the verification task is to verify whether two random samples, drawn from either of the source and target domains 110 and 120, belong to the same class (it is not known which distribution the two random samples come from a priori).

Let the source domain 110 be denoted as $X_S$, the target domain 120 be denoted as $X_T$, and the two random samples be denoted as x and x'. There are three scenarios of constructing a pair: (1) x, x'$\in X_S$; (2) x, x'$\in X_T$; and (3) x $\in X_S$, x'$\in X_T$. Scenarios (1) and (2) can be referred to as intra-domain verifications, while the scenario (3) can be referred to as a cross-domain (or inter-domain) verification.

For intra-domain verification scenarios, a source (or target) domain classifier may be needed. For the source domain 110, adequately labeled training examples can be provided to learn a competent classifier. For the target domain 120, only unlabeled training examples are provided. However, the discriminative power of the classifier can be transferred to the target domain 120 by adapting the representation spaces of $X_T \times X_T$ and $X_S \times X_S$. That is, the same competent classifier from the source domain 110 can be used to verify target domain pairs if the two domains are well-aligned. For the cross-domain verification scenario, it can be assumed that the two samples x and x' cannot be of the same class, which is true for problems such as, e.g., cross-ethnicity facial verification problems.

To handle both the intra-domain and cross-domain verification scenarios described above, the FTN subsystem 102 can further include an FTN component 130. The FTN component 130 can separate target features of the target domain 120 from source features of the source domain 110 while simultaneously aligning the features with an auxiliary domain of transformed source features. For example, the FTN component 130 can include a plurality of modules. More specifically, the FTN component 130 can include a feature generation module and a feature transfer module.

As further shown, an output of the FTN component 130 is received as input into each of a verification component 140, an entropy minimization component 150 and a domain discriminator 160.

In the automatic labeling subsystem 104, target images 170 can be provided as input into the target domain 120 for automatic labeling.

Further details regarding the implementation of the system 100 will now be described below with reference to FIGS. 2-3.

Figure 2:
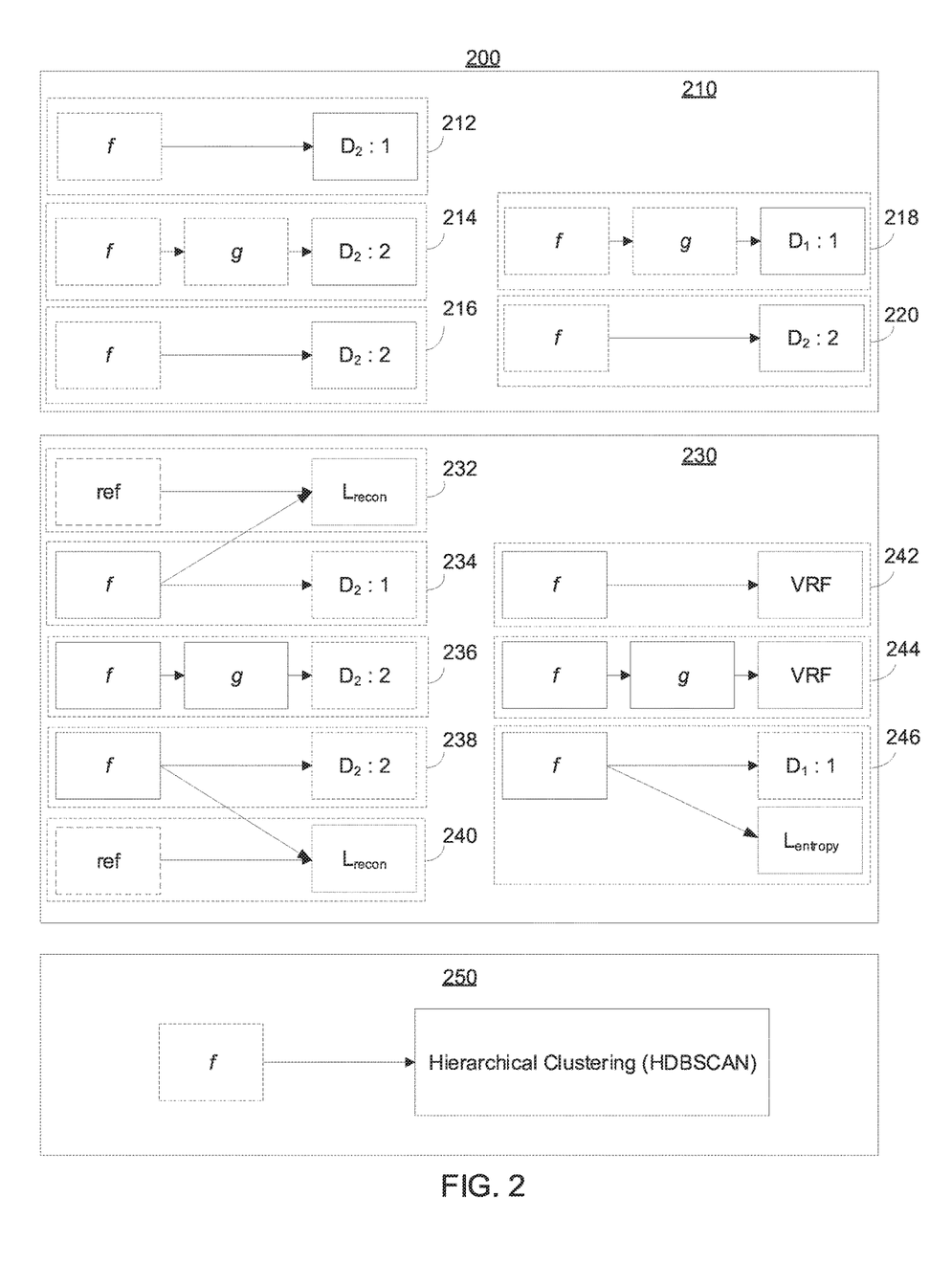
FIG. 2 is a block/flow diagram of an overview of a training framework for implementing an unsupervised cross-domain distance metric adaptation framework with a feature transfer network for enhancing facial recognition, in accordance with an embodiment of the present invention.

With reference to FIG. 2, a block/flow diagram is provided illustrating an exemplary system/method 200 of an overall training framework by recursively or iteratively training a feature transfer network (FTN) and automatic labeling of data using the trained FTN. The system/method 200 can be implemented within the system 100 to implement an unsupervised cross-domain distance metric adaptation framework with a feature transfer network for enhancing facial recognition.

The system/method 200 includes a section 210 corresponding to a training protocol of domain discriminators $D_1$ and $D_2$, a section 230 corresponding to training of a feature generator f and a feature transformer g, and a section 250 corresponding to an automatic labeling protocol. To perform the automatic labeling, section 250 can implement clustering of target examples for providing pseudo-labels. For example, section 250 can implement a density-based spatial clustering of applications with noise (DBSCAN) method with trained feature network feature representation. More specifically, section 250 can implement hierarchical clustering. For example, section 250 can implement a hierarchical DBSCAN (HDBSCAN) method.

Sections 210 and 230 collectively correspond to an iterative training of the FTN between the discriminators, the feature generator f and the feature transformer g using unlabeled source and target examples. As will be described in further detail, the feature transformer g can allow joint optimization with domain adversarial loss (via $D_1$) and domain separation loss (via $D_2$).

The feature generator f, which is represented as f: X→Z, can map $X_S$ and $X_T$ to distinguishable representation spaces $f(X_S)$ and $f(X_T)$. A domain separation objective function (e.g., loss function), $L_{sep}$, can be used to achieve this separation, where the term "domain separation" indicates that the representation space can be separated with respect to domain definitions (e.g., source or target).

The feature transformer g, which can be represented as g: Z→Z, can transform $f(X_S)$ to $g(f(X_S))$ for alignment with $f(X_T)$. A domain adversarial objective function, $L_{adv}$, can be used to achieve the alignment, where the term "domain separation" indicates that the representation space can be separated with respect to domain definitions (e.g., source or target).

Domain adversarial objective functions for domain alignment can be applied between transformed source and target domains by $D_1$ and can apply $L_{sep}$ to distinguish the source domain from both the target domain and the transformed source domains by $D_2$. Verification objective functions can be applied to source pairs $f(X_S)$ and transformed source pairs $g(f(X_S))$ using classifiers. For example, the classifiers can include classifiers $h_f$, $h_g$:Z×Z→{0, 1}.

During testing, the metric distance between f(x) and f(x') can be compared. The following desired capabilities can be achieved:

1. If x and x' are from different domains, f(x) and f(x') will be far away due to the functionality of the feature generation module;

2. If x, x'∈$X_s$, then f(x) and f(x') will be close if they belong to the same class and far away otherwise, due to the discriminative power acquired from optimizing $h_f$; and 3. If x, x'∈$X_T$, then f(x) and f(x'), then f(x) and f(x') will be close if they belong to the same class and far away otherwise, due to the discriminative power acquired from optimizing $h_g$.

More specifically, section 210 is shown including sub-sections 212 through 220 for training the domain discriminators $D_1$ and $D_2$. The discriminator $D_2$ is trained to discriminate between source features and the mixture of source-augmented features and target features. Additionally, the discriminator $D_1$ is trained to discriminate between source-augmented features and target features.

Sub-sections 212, 214 and 216 generate outputs for training an objective function (e.g., loss function) corresponding to the discriminator $D_2$, $L_{D_2}$. More specifically, sub-sections 212 and 214 correspond to the source domain, while sub-section 216 corresponds to the target domain. As an illustrative example, $L_{D_2}$ can be trained as follows, where $\mathbb{E}$ refers to the expectation or expected value:

$$L_{D_2} = \mathbb{E}_{x \in X_s} \log D_2(f(x), 1) + \frac{1}{2}[\mathbb{E}_{x \in X_s} \log D_2(g(f(x)), 2) + \mathbb{E}_{x \in X_T} \log D_2(f(x), 2)]$$

where $\mathbb{E}_{x \in X_s} \log D_2$ (f(x), 1) is an output of sub-section 212, $\mathbb{E}_{x \in X_s} \log D_2$ (g(f(x)), 2) is an output of sub-section 214, and $\mathbb{E}_{x \in X_T} \log D_2$ (f(x), 2) is an output of sub-section 216.

Sub-sections 218 and 220 generate outputs for training an objective function (e.g., loss function) corresponding to the discriminator $D_1$, $L_{D_1}$. More specifically, sub-section 218 corresponds to the source domain and sub-section 220 corresponds to the target domain. As an illustrative example, $L_{D_1}$ can be trained as follows:

$$L_{D_1} = \mathbb{E}_{x \in X_s} \log D_1(g(f(x)),1) + \mathbb{E}_{x \in X_T} \log D_1(f(x),2)$$

where $\mathbb{E}_{x \in X_s} \log D_1$ (g(f(x)), 1) is an output of sub-section 218 and $\mathbb{E}_{x \in X_T} \log D_1$ (f(x), 2) is an output of sub-section 220.

Section 230 provides a training protocol of the feature generator f and the feature transformer g. As shown, section 230 can include a plurality of sub-sections 232 through 246, where sub-sections 232, 234, 236, 242 and 244 correspond to the source domain and sub-sections 238, 240 and 246 correspond to the target domain.

More specifically, section 230 can train an objective function (e.g., loss function) corresponding to the feature transformer g, $L_g$, an objective function (e.g., loss function) corresponding to the feature generator f, $L_f$, an objective function (e.g., loss function) corresponding to feature reconstruction loss between features extracted from the feature generator (f) and the reference network (ref), $L_{recon}$, and an objective function (e.g., loss function) corresponding to multi-class entropy minimization loss, $L_{entropy}$. For purposes of training the objective functions in section 230, sub-section 234 can generate a same or similar output as sub-section 212, sub-section 236 can generate a same or similar output as sub-section 214, and sub-section 238 can generate a same or similar output as sub-section 216. Further details regarding the objective functions trained by section 230 will now be described below.

$L_g$ can be trained by verification loss and domain separation loss via the discriminator $D_2$. As an illustrative example, $L_g$ can be trained as follows:

$$L_g = L_{vrf}(g) + \lambda_2 \mathbb{E}_{x \in X_s} \log D_2(g(f(x)),2)$$

where $L_{vrf}$ refers to an objective function (e.g., loss function) corresponding to verification loss between labeled pairs of images and $\lambda_2$ refers to a hyper-parameter that balances the verification loss and the adversarial loss with respect to $D_2$. As used herein, a "hyper-parameter" refers to a regularization coefficient (e.g., non-negative real number) that can be defined by a user. For example, $\mathbb{E}_{x \in X_s} \log D_2$ (g(f(x)), 2) can be generated by sub-section 236, and $L_{vrf}$(g) can be generated by sub-section 244. An illustrative example of the training of $L_{vrf}$ will be provided below.

$L_f$ can be trained by verification loss from both source and source-augmented features, domain separation loss via the discriminator $D_2$, and domain adversarial loss via $D_1$. As an illustrative example, $L_f$ can be trained as follows:

$$L_f = \frac{1}{2}[L_{vrf}(g) + L_{vrf}(f)] + \lambda_1 \mathbb{E}_{x \in X_T} \log D_1(f(x), 1) + \lambda_2 L_{D_2}$$

where $\lambda_1$ refers to a hyper-parameter that balances the verification loss and the adversarial loss with respect to $D_1$. For example, $L_{vrf}$ (f) can be generated by sub-section 242, $L_{vrf}$(g) can be generated by sub-section 244, and $\mathbb{E}_{x \in X_T} \log D_1$ (f(x), 1) can be generated by sub-section 246.

$L_{vrf}$ (f) used can be trained as follows:

$$L_{vrf}(f) = \mathbb{E}_{x_i, x_j \in X_s}[y_{ij} \log \sigma(f(x_i)^T f(x_j)) + (1-y_{ij})\log(1-\sigma(f(x_i)^T f(x_j)))]$$

where $y_{ij}$ refers to the ground truth verification label of examples $x_i$ and $x_j$ (e.g., $y_{ij}=1$ if $x_i$ and $x_j$ represent a same feature (e.g., same face of a person) and $y_{ij}=0$ otherwise), $\sigma$ refers to the sigmoid function $$\left(\text{e. g., } \sigma_a = \frac{1}{1+e^{-a}}\right)$$

and f $(x_i)^T$ refers to the transpose of the vector f $(x_i)$. $L_{vrf}$(f) can be extended into an N-pair distance metric loss for faster convergence and improved performance. $L_{vrf}$(g) can be trained in a similar manner.

$L_{recon}$ can correspond to feature reconstruction loss between features extracted from the feature generator f and a reference network (ref) pretrained using labeled source data to stabilize the challenging adversarial training. As an illustrative example, $L_{recon}$ can be trained as follows:

$$L_{recon} = -[\lambda_3 \mathbb{E}_{x \in X_s} \|f(x)-f_{ref}(x)\|_2^2 + \lambda_4 \mathbb{E}_{x \in X_T} \|f(x)-f_{ref}(x)\|_2^2]$$

where $f_{ref}$(x) refers to the representation of an input x using reference network $f_{ref}$, and $\lambda_3$ and $\lambda_4$ refer to hyper-parameters. For example, $\mathbb{E}_{x \in X_s} \|f(x)-f_{ref}(x)\|_2^2$ can be generated by sub-section 232, and $\mathbb{E}_{x \in X_T} \|f(x)-f_{ref}(x)\|_2^2$ can be generated by sub-section 240.

$L_{entropy}$ can use pseudo-labels retrieved by hierarchical clustering. As an illustrative example, $L_{entropy}$ can be trained as follows:

$$L_{entropy} = \mathbb{E}_{(x_n, x_n^+) \in X_T}\left[\sum_{n=1}^{N} p_n \log p_n\right]$$

-continued
$$p_n(f) \triangleq \frac{\exp(f(x_n)^T f(x_n^+))}{\sum_{k=1}^{N} \exp(f(x_n)^T f(x_k^+))}$$

where $x_n^+$ refers to the positive example of $x_n$ (e.g., $x_n$ and $x_n^+$ are face images from the same identity class).

Figure 3:
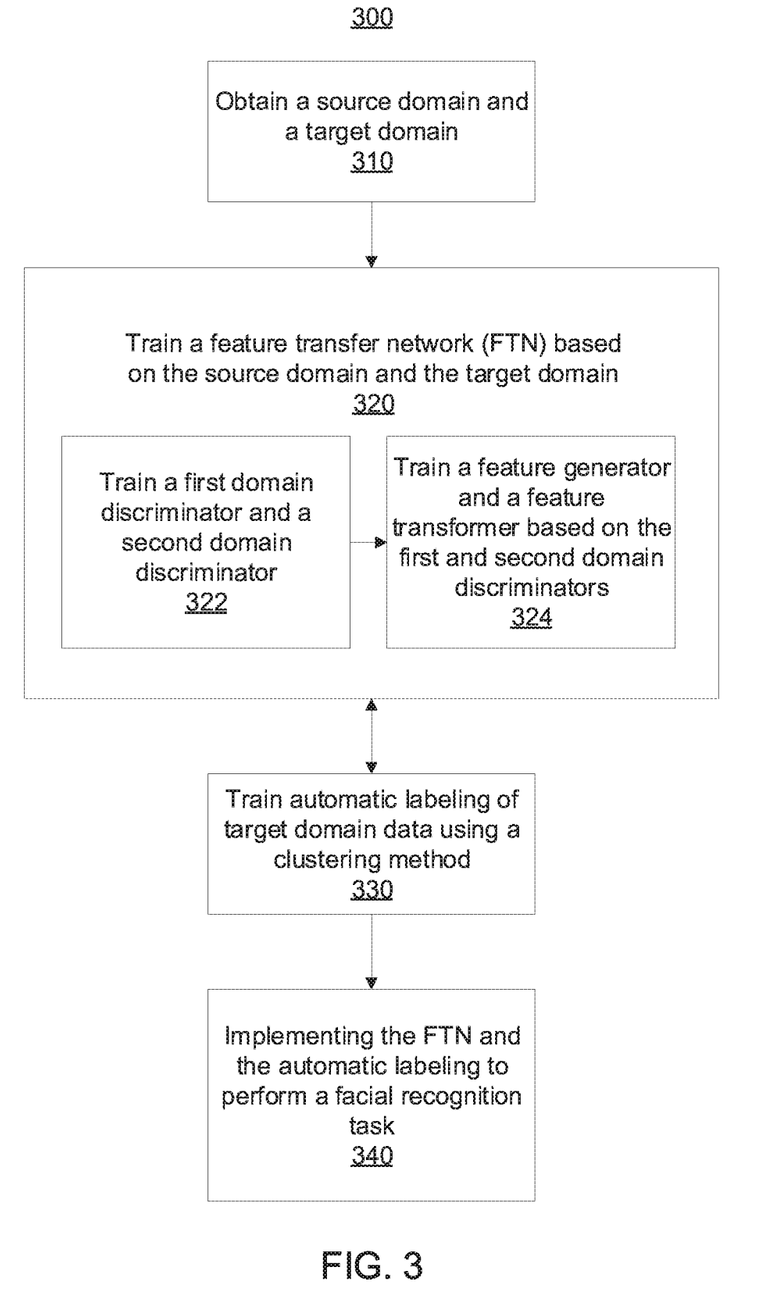
FIG. 3 is a block/flow diagram of a system/method for implementing an unsupervised cross-domain distance metric adaptation framework with a feature transfer network for enhancing facial recognition, in accordance with an embodiment of the present invention.

With reference to FIG. 3, a block/flow diagram is provided illustrating a system/method 300 for implementing an unsupervised cross-domain distance metric adaptation framework with a feature transfer network for enhancing facial recognition.

At block 310, a source domain and a target domain are obtained. The source domain can be associated with labeled source data (e.g., labeled source examples), while the target domain can be associated with unlabeled target data (e.g., unlabeled examples). The source and target domains can be obtained for purposes of implementing facial recognition. For example, in an illustrative embodiment, the source and target domains can correspond to respective ethnicities for facial recognition, where the source domain can correspond to source ethnicity and the target domain can correspond to a target ethnicity.

The source and target domains can be provided to perform a verification task. More specifically, the verification task can include a binary classification task shared across the source and target domains that takes a pair of images as an input and predicts a label of "1" if the pair of images shared the same identity, and predicts a label of "0" otherwise. The goal of the verification task is to verify whether two random samples, drawn from either of the source and target domains, belong to the same class (it is not known which distribution the two random samples come from a priori).

At block 320, a feature transfer network (FTN) is trained based on the source domain and the target domain.

For example, training the FTN can include, at block 322 training a first domain discriminator and a second domain discriminator. Training the first and second domain discriminators can include training an objective function corresponding to the first discriminator and training a second objective function corresponding to the second discriminator. The first domain discriminator can be trained to discriminate between source-augmented features and target features, and the second domain discriminator can be trained to discriminate between source features and a mixture of the source-augmented features and the target features. Further details regarding block 322 are described above with reference to FIG. 2 (e.g., section 210 of the system/method 200).

Training the FTN can further include, at block 324, training a feature generator and a feature transformer based on the first and second domain discriminators. The feature generator can allow for joint optimization with domain adversarial loss via the first domain discriminator and domain separation loss via the second domain discriminator.

Training the feature generator and the feature transformer can include training an objective function corresponding to the feature transformer and training an objective function corresponding to the feature generator. More specifically, feature generator training can include verification loss from both the source and the source-augmented features, domain separation loss via the second domain discriminator, and domain adversarial loss via the first domain discriminator. Feature transformer training can include verification loss and domain separation loss via the second domain discriminator.

In one embodiment, training the feature generator and the feature transformer can further include training an objective function corresponding to verification loss associated with the feature generator, and training an objective function corresponding to verification loss associated with the feature transformer. The objective function corresponding to the feature generator can be trained based in part on the objective function corresponding to verification loss associated with the feature generator, and the objective function corresponding to the feature transformer can be trained based in part on the objective function corresponding to verification loss associated with the feature transformer. The verification loss can be extended into N-pair distance metric loss for faster convergence and improved performance.

In one embodiment, training the feature generator and the feature transformer can further include training an objective function corresponding to feature reconstruction loss between features extracted from the feature generator and a reference network pretrained using labeled source data to stabilize the challenging adversarial training. For example, the objective function corresponding to feature reconstruction loss can be trained based on representations of examples from the source and target domains using the reference network.

In one embodiment, training the feature generator and the feature transformer can further include training an objective function corresponding to multi-class entropy minimization loss. The objective function corresponding to multi-class entropy minimization loss can use labels (e.g., pseudo-labels) retrieved by clustering (e.g., from block 330 as described in further detail below). For example, the objective function corresponding to multi-class entropy minimization loss can be trained based on positive examples of respective examples from the target domain.

Further details regarding block 324 are described above with reference to FIG. 2 (e.g., section 230 of the system/method 200).

At block 330, automatic labeling of target domain data is trained using a clustering method. For example, target examples corresponding to the target domain can be automatically labeled. The target examples can include, e.g., target images.

Automatically labeling the target examples can include clustering of the target examples for providing pseudo-labels to automatically discover class structure for the target domain. For example, clustering the target examples can include implementing a density-based spatial clustering of applications with noise (DBSCAN) method with trained feature network feature representation. More specifically, clustering the target examples can include implementing hierarchical clustering. For example, clustering the target examples can include implementing a hierarchical DBSCAN (HDBSCAN) method.

As shown, the training of the feature transfer network and the automatic labeling can be recursive or iterative. More specifically, an output of the training at block 320 can be provided as input for training the automatic labeling at block 330, and an output of the training at block 330 can be provided as input for training the feature transfer network at block 320.

At block 340, the feature transfer network and the automatic labeling can be implemented to perform a facial recognition task. For example, the training of the feature transfer network and the automatic labeling can be applied to the globalization of facial analysis engines, such as facial verification and identification, gender prediction, age estimation, etc. The training of the feature transfer network and the automatic labeling can improve the generalization ability of face analysis engines to the target domain of different ethnicities, and can achieve facial recognition, gender, prediction, age estimation, etc. across different ethnicities without direct task-specific supervision from the target domain. Additionally, the training of the feature transfer network and the automatic labeling can reduce development cost on data annotation by utilizing labeled data from the target domain to improve the generalization ability of face analysis engines.

The system/method 300 introduces a source-augmented embedding space via a feature transformer, which allows for a unified learning framework of domain adversarial and domain separation for performing a facial recognition task using labeled source data and unlabeled target data. The recursive or iterative training framework of the system/method 300 of feature transfer network learning and automatic class structure discovery can allow for fast and accurate labeling of unlabeled target data and improved quality of feature representation. Accordingly, the system/method 300 can enable efficient deployment of facial recognition systems while bypassing potentially expensive data annotation processes.

The system/method 300 can be implemented to globalize a facial analysis system by adapting the facial analysis system to one or more new target domains based on information from one or more source domains. Illustratively, in the context of domains associated with ethnicities, a source ethnicity domain (e.g., Caucasian source domain) can include abundant labeled training data, while at least one target ethnicity domain (e.g., non-Caucasian target domain) can include abundant unlabeled target data. Examples of possible target domains in this illustrative example can include, but are not limited to, African-American, East-Asian, South-Asian, Hispanic, etc. An illustrative example of this implementation will now be described with reference to FIG. 4.

Figure 4:
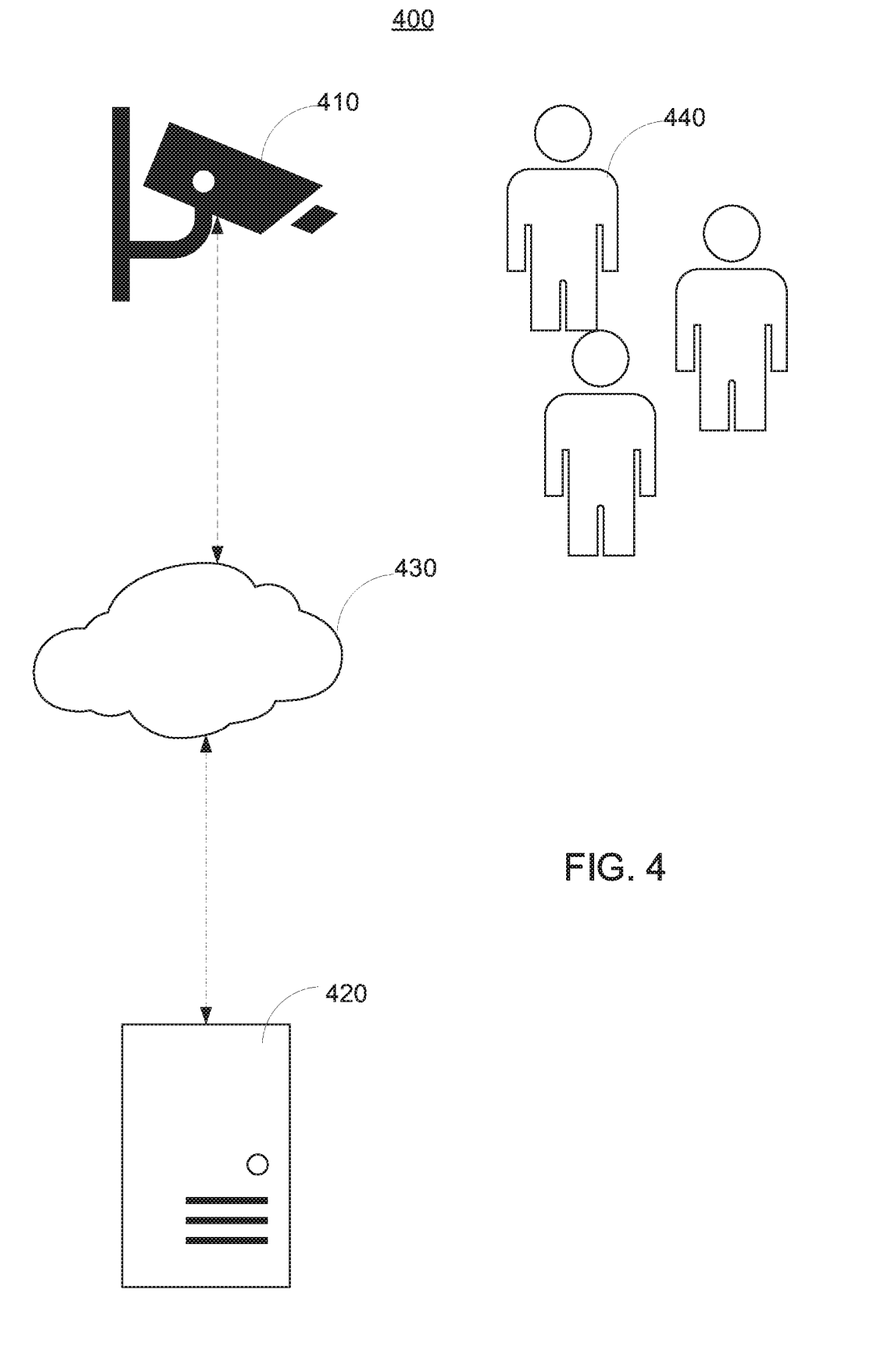
FIG. 4 is a block diagram illustrating an exemplary implementation of the system.

With reference to FIG. 4, a diagram is provided illustrating an exemplary system 400. The system 400 can include at least one facial image collection device 410 and at least one processing device 420 in communication with at least one network 430. The device 410 can include any suitable device configured to collect facial image data (e.g., a camera). For example, as shown, the device 410 can collect a facial image from at least one user 440.

The processing device 420 can include a facial analysis engine configured to annotate facial images with respect to a task of interest. In some embodiments, the facial analysis engine can be further configured to perform the task of interest based on the annotated facial images. For example, facial images collected by the device 410 can be obtained by the processing device 420 over the at least one network 430 to perform the task of interest. Examples of tasks that can be performed by the processing device 420 include, but are not limited to, identification, gender prediction, age estimation, etc.

The user 440 can be associated with a new ethnicity domain within the system 400, and the facial analysis engine of the processing device 420 can be adapted to the ethnicity domain associated with the user 440 in accordance with the embodiments described above with reference to FIGS. 1-3.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
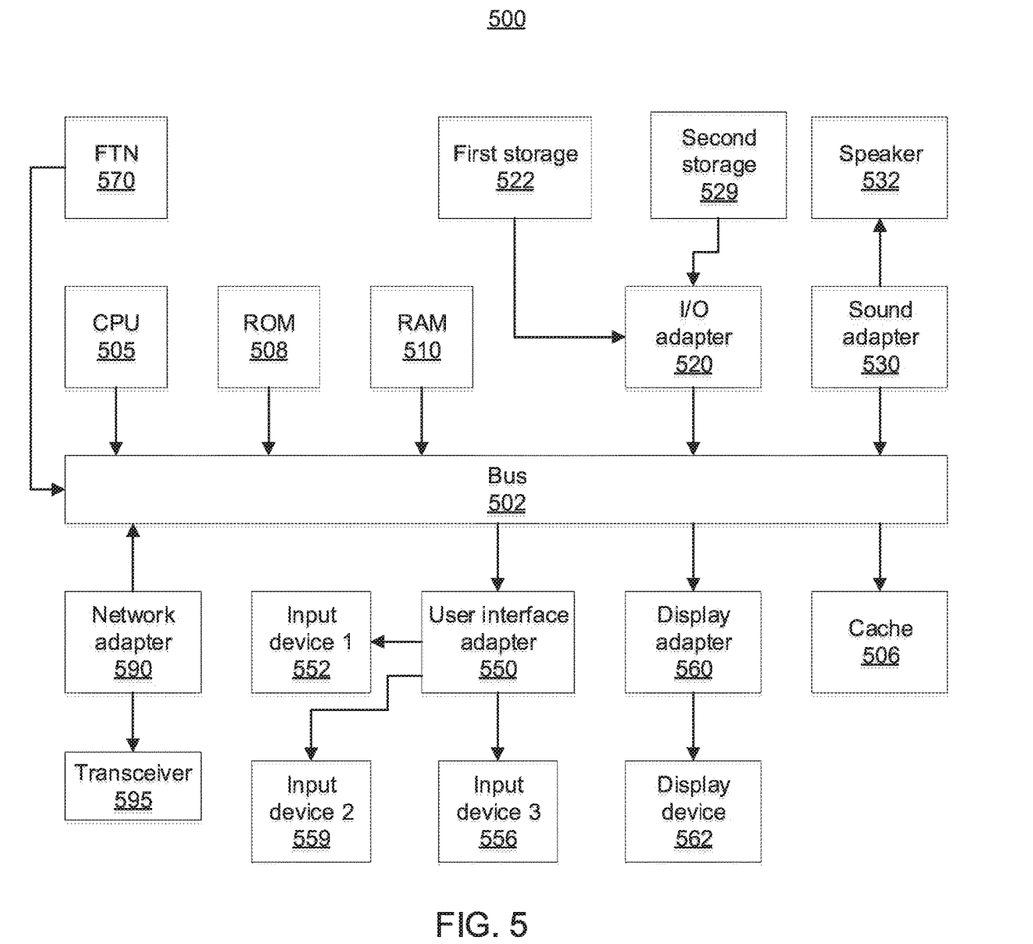
FIG. 5 is a block/flow diagram illustrating a computer system, in accordance with an embodiment of the present invention.

Referring now to FIG. 5, an exemplary computer system 500 is shown which may represent a server or a network device, in accordance with an embodiment of the present invention. The computer system 500 includes at least one processor (CPU) 505 operatively coupled to other components via a system bus 502. A cache 506, a Read Only Memory (ROM) 508, a Random-Access Memory (RAM) 510, an input/output (I/O) adapter 520, a sound adapter 530, a network adapter 590, a user interface adapter 550, and a display adapter 560, are operatively coupled to the system bus 502.

A first storage device 522 and a second storage device 529 are operatively coupled to system bus 502 by the I/O adapter 520. The storage devices 522 and 529 can be any of a disk storage device (e.g., a magnetic or optical disk storage device), a solid state magnetic device, and so forth. The storage devices 522 and 529 can be the same type of storage device or different types of storage devices.

A speaker 532 may be operatively coupled to system bus 502 by the sound adapter 530. A transceiver 595 is operatively coupled to system bus 502 by network adapter 590. A display device 562 is operatively coupled to system bus 502 by display adapter 560.

A first user input device 552, a second user input device 559, and a third user input device 556 are operatively coupled to system bus 502 by user interface adapter 550. The user input devices 552, 559, and 556 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 552, 559, and 556 can be the same type of user input device or different types of user input devices. The user input devices 552, 559, and 556 are used to input and output information to and from system 500.

Feature transfer network (FTN) component 570 may be operatively coupled to system bus 502. FTN component 570 is configured to perform one or more of the operations described above. For example, FTN component 570 can be implemented as part of a facial analysis engine. FTN component 570 can be implemented as a standalone special purpose hardware device, or may be implemented as software stored on a storage device. In the embodiment in which FTN component 470 is software-implemented, although shown as a separate component of the computer system 500, FTN component 570 can be stored on, e.g., the first storage device 522 and/or the second storage device 1029. Alternatively, FTN component 570 can be stored on a separate storage device (not shown).

Of course, the computer system 500 may also include other elements (not shown), as readily contemplated by one of skill in the art, as well as omit certain elements. For example, various other input devices and/or output devices can be included in computer system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 500 are readily contemplated by one of ordinary skill in the art given the teachings of the present invention provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for implementing an unsupervised cross-domain distance metric adaptation framework with a feature transfer network for enhancing facial recognition, comprising:

recursively training a feature transfer network based on a source domain associated with labeled source data and a target domain associated with unlabeled target data, and automatic labeling of target domain data using a clustering method, training the feature transfer network including:
  training a first domain discriminator to discriminate between source-augmented features and target features and a second domain discriminator to discriminate between source features and a mixture of the source-augmented features and the target features, including training an objective function corresponding to the first domain discriminator and an objective function corresponding to the second domain discriminator; and
  training a feature generator and a feature transformer based on the first and second domain discriminators, including training an objective function corresponding to the feature generator and an objective function corresponding to the feature transformer; and
implementing the feature transfer network and the automatic labeling to perform a facial recognition task.

2. The method of claim 1, wherein:
training the feature generator includes verification loss from both the source features and the source-augmented features, domain separation loss via the second domain discriminator, and domain adversarial loss via the first domain discriminator; and
training the feature transformer includes verification loss and domain separation loss via the second domain discriminator.

3. The method of claim 1, wherein training the feature generator and the feature transformer further includes training an objective function corresponding to verification loss associated with the feature generator, and training an objective function corresponding to verification loss associated with the feature transformer.

4. The method of claim 1, wherein training the feature generator and the feature transformer further includes training an objective function corresponding to feature reconstruction loss between features extracted from the feature generator and a reference network pretrained using the labeled source data.

5. The method of claim 1, wherein training the feature generator and the feature transformer further includes training an objective function corresponding to multi-class entropy minimization loss.

6. The method of claim 1, wherein the automatic labeling includes implementing a hierarchical density-based spatial clustering of applications with noise method.

7. A computer program product comprising a non-transitory computer readable storage medium having program instructions embodied therewith, the program instructions executable by a computer to cause the computer to perform a method for implementing an unsupervised cross-domain distance metric adaptation framework with a feature transfer network for enhancing facial recognition, the method performed by the computer comprising:

recursively training a feature transfer network based on a source domain associated with labeled source data and a target domain associated with unlabeled target data, and automatic labeling of target domain data using a clustering method, training the feature transfer network including:
  training a first domain discriminator to discriminate between source-augmented features and target features and a second domain discriminator to discriminate between source features and a mixture of the source-augmented features and the target features, including training an objective function corresponding to the first domain discriminator and an objective function corresponding to the second domain discriminator; and training a feature generator and a feature transformer based on the first and second domain discriminators, including training an objective function corresponding to the feature generator and an objective function corresponding to the feature transformer; and implementing the feature transfer network and the automatic labeling to perform a facial recognition task.

8. The computer program product of claim 7, wherein:
training the feature generator includes verification loss from both the source features and the source-augmented features, domain separation loss via the second domain discriminator, and domain adversarial loss via the first domain discriminator; and training the feature transformer includes verification loss and domain separation loss via the second domain discriminator.

9. The computer program product of claim 7, wherein training the feature generator and the feature transformer further includes training an objective function corresponding to verification loss associated with the feature generator, and training an objective function corresponding to verification loss associated with the feature transformer.

10. The computer program product of claim 7, wherein training the feature generator and the feature transformer further includes training an objective function corresponding to feature reconstruction loss between features extracted from the feature generator and a reference network pretrained using the labeled source data.

11. The computer program product of claim 7, wherein training the feature generator and the feature transformer further includes training an objective function corresponding to multi-class entropy minimization loss.

12. The computer program product of claim 7, wherein the automatic labeling includes implementing a hierarchical density-based spatial clustering of applications with noise method.

13. A system for implementing an unsupervised cross-domain distance metric adaptation framework with a feature transfer network for enhancing facial recognition, comprising:
a memory device for storing program code; and
at least one processor device operatively coupled to a memory device and configured to execute program code stored on the memory device to:
recursively train a feature transfer network based on a source domain associated with labeled source data and a target domain associated with unlabeled target data, and automatic labeling of target domain data using a clustering method, the at least one processor device being configured to train the feature transfer network by:
training a first domain discriminator to discriminate between source-augmented features and target features and a second domain discriminator to discriminate between source features and a mixture of the source-augmented features and the target features, including training an objective function corresponding to the first domain discriminator and an objective function corresponding to the second domain discriminator; and training a feature generator and a feature transformer based on the first and second domain discriminators, including training an objective function corresponding to the feature generator and an objective function corresponding to the feature transformer; and implement the feature transfer network and the automatic labeling to perform a facial recognition task.

14. The system of claim 13, wherein:
the at least one processor device is further configured to train the feature generator by verification loss from both the source features and the source-augmented features, domain separation loss via the second domain discriminator, and domain adversarial loss via the first domain discriminator; and the at least one processor device is further configured to train the feature transformer by verification loss and domain separation loss via the second domain discriminator.

15. The system of claim 13, wherein the at least one processor device is further configured to train the feature generator and the feature transformer by training an objective function corresponding to verification loss associated with the feature generator, and training an objective function corresponding to verification loss associated with the feature transformer.

16. The system of claim 13, wherein the at least one processor device is further configured to train the feature generator and the feature transformer by training an objective function corresponding to feature reconstruction loss between features extracted from the feature generator and a reference network pretrained using the labeled source data.

17. The system of claim 13, wherein the at least one processor device is further configured to train the feature generator and the feature transformer by training an objective function corresponding to multi-class entropy minimization loss.

18. The system of claim 13, wherein the automatic labeling includes implementing a hierarchical density-based spatial clustering of applications with noise method.

* * * * *